(12) United States Patent
Stokes et al.

(10) Patent No.: US 11,849,032 B2
(45) Date of Patent: Dec. 19, 2023

(54) SYSTEMS AND METHODS FOR BLOCKCHAIN-BASED SECURE KEY EXCHANGE

(71) Applicant: Verizon Patent and Licensing Inc., Basking Ridge, NJ (US)

(72) Inventors: John M. Stokes, Yorba Linda, CA (US); Manuel Enrique Caceres, Basking Ridge, NJ (US); Young Rak Choi, Belle Mead, NJ (US); Warren Hojilla Uy, Randolph, NJ (US); Mun Wei Low, Irving, TX (US); Dayong He, Bridgewater, NJ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 221 days.

(21) Appl. No.: 17/321,378

(22) Filed: May 14, 2021

(65) Prior Publication Data

US 2022/0368521 A1    Nov. 17, 2022

(51) Int. Cl.
*H04L 9/08* (2006.01)
*H04L 9/14* (2006.01)
(Continued)

(52) U.S. Cl.
CPC .......... *H04L 9/0838* (2013.01); *H04L 9/0825* (2013.01); *H04L 9/14* (2013.01);
(Continued)

(58) Field of Classification Search
CPC ....... H04L 9/0838; H04L 9/0825; H04L 9/14; H04L 9/3073; H04L 9/3239; H04L 9/50; H04L 9/006; H04L 9/0861
See application file for complete search history.

(56) References Cited

U.S. PATENT DOCUMENTS 10,999,260 B1 *   5/2021   Silvestri ................ H04L 9/0825
11,423,474 B1 *   8/2022   Ribeiro ..................... H04L 9/50
(Continued)

OTHER PUBLICATIONS

T. Perrin et al., "The Double Ratchet Algorithm," Signal, Nov. 20, 2016 (available at https://signal.org/docs/specifications/doubleratchet/, visited Apr. 23, 2021).
(Continued)

*Primary Examiner* — Carl G Colin
*Assistant Examiner* — Andrew Suh

(57) ABSTRACT

A system described herein provide for the secure maintaining and providing of information, such as public keys used in Public Key Infrastructure ("PKI") techniques or other techniques, using a secure distributed ledger (e.g., "blockchain") system. A blockchain system may be utilized in lieu of a key escrow system in the exchange and/or providing of public keys in a Diffie-Hellman key exchange technique or other type of technique in which public keys are provided from one entity to another. A first entity may generate an asymmetric key pair that includes a public key and a private key, and may provide the public key to a blockchain system for retrieval by one or more other entities. For example, the entities may be engaged in a secure messaging session, in which messages are encrypted and may be decrypted using one or more keys, including the public key.

20 Claims, 9 Drawing Sheets

(51) Int. Cl.
  *H04L 9/30* (2006.01)
  *H04L 9/32* (2006.01)
  *H04L 9/00* (2022.01)
(52) U.S. Cl.
  CPC .......... *H04L 9/3073* (2013.01); *H04L 9/3239* (2013.01); *H04L 9/50* (2022.05)

(56) References Cited

U.S. PATENT DOCUMENTS

| | | | |
|---|---|---|---|
| 2019/0268312 A1* | 8/2019 | Ma | H04L 63/123 |
| 2022/0107994 A1* | 4/2022 | Bernardi | G06F 21/105 |
| 2022/0294611 A1* | 9/2022 | Katsumata | H04L 9/0844 |
| 2023/0021047 A1* | 1/2023 | Ammar | H04L 9/3073 |

OTHER PUBLICATIONS

Wikipedia, "Key escrow," Nov. 20, 2020 (available at https://en.wikipedia.org/w/index.php?title=Key_excrow&oldid=989705940, visited Apr. 23, 2021).

S. Maheshwari, "Learn step-by-step how to set up a basic blockchain network," Think 2021: The premier hybrid cloud and AI event, Jul. 10, 2020 (available at https://developer.ibm.com/technologies/blockchain/tutorials/quick-start-guide-for-ibm-blockchain-platform/, visited May 7, 2021).

* cited by examiner

SYSTEMS AND METHODS FOR BLOCKCHAIN-BASED SECURE KEY EXCHANGE

BACKGROUND

Some encryption techniques, such as Public Key Infrastructure ("PKI") techniques, may make use of public keys, which may be used to encrypt messages that may be decrypted using an associated private key, and/or may be used in other techniques. Public keys may be distributed or stored by key escrow systems, which may provide a single point of failure and/or an opportunity for a "man-in-the-middle" attack, via which public key may be obtained, modified, and/or otherwise compromised.

DETAILED DESCRIPTION OF EXAMPLE EMBODIMENTS

The following detailed description refers to the accompanying drawings. The same reference numbers in different drawings may identify the same or similar elements.

Embodiments described herein provide for the secure maintaining and providing of information, such as public keys used in PKI techniques or other techniques, using a secure distributed ledger (e.g., "blockchain") system. For example, embodiments described herein may utilize a blockchain system in lieu of a key escrow system in the exchange and/or providing of public keys in a Diffie-Hellman key exchange technique or other type of technique in which public keys are provided from one entity to another. For example, as discussed herein, a first entity may generate an asymmetric key pair that includes a public key and a private key, and may provide the public key to a blockchain system for retrieval by one or more other entities. For example, the entities may be engaged in a secure messaging session, in which messages are encrypted and may be decrypted using one or more keys, including the public key. For example, the messaging session may be associated with multiple key derivation functions, in which a first key or set of keys (e.g., "root" keys) are used in the generation of one or more other keys (e.g., "send" keys and/or "receive" keys). A root key derivation function, for example, may be performed by first and second entities engaged in the communication session to generate respective send and/or receive keys for each entity. The entities may make use of different private keys in their respective root derivation functions, but may utilize one or more shared public keys for their respective root derivation functions. Examples of techniques that make use of multiple key derivation functions, including a root derivation function utilizing one or more shared public keys, include a "double ratchet" encryption technique, a "Signal Protocol," and/or other types of techniques.

In some embodiments, the contents of the secured ledger system (e.g., blockchain) may be publicly available or accessible, but the information stored therein may have no meaning or use to an attacker or other malicious user, in the context of obtaining public keys associated with PKI techniques or other techniques. In some embodiments, a private blockchain may be used, in which only authorized entities are able to access the information stored in the private blockchain. Further, as records stored in a blockchain system are immutable, an attacker may be prevented from modifying public keys and thereby potentially having access to information encrypted based on such keys. For simplicity, embodiments described herein are described in the context of the secured ledger system being a blockchain system. However, similar concepts may apply to another type of secured ledger system other than a blockchain system.

Figure 1:
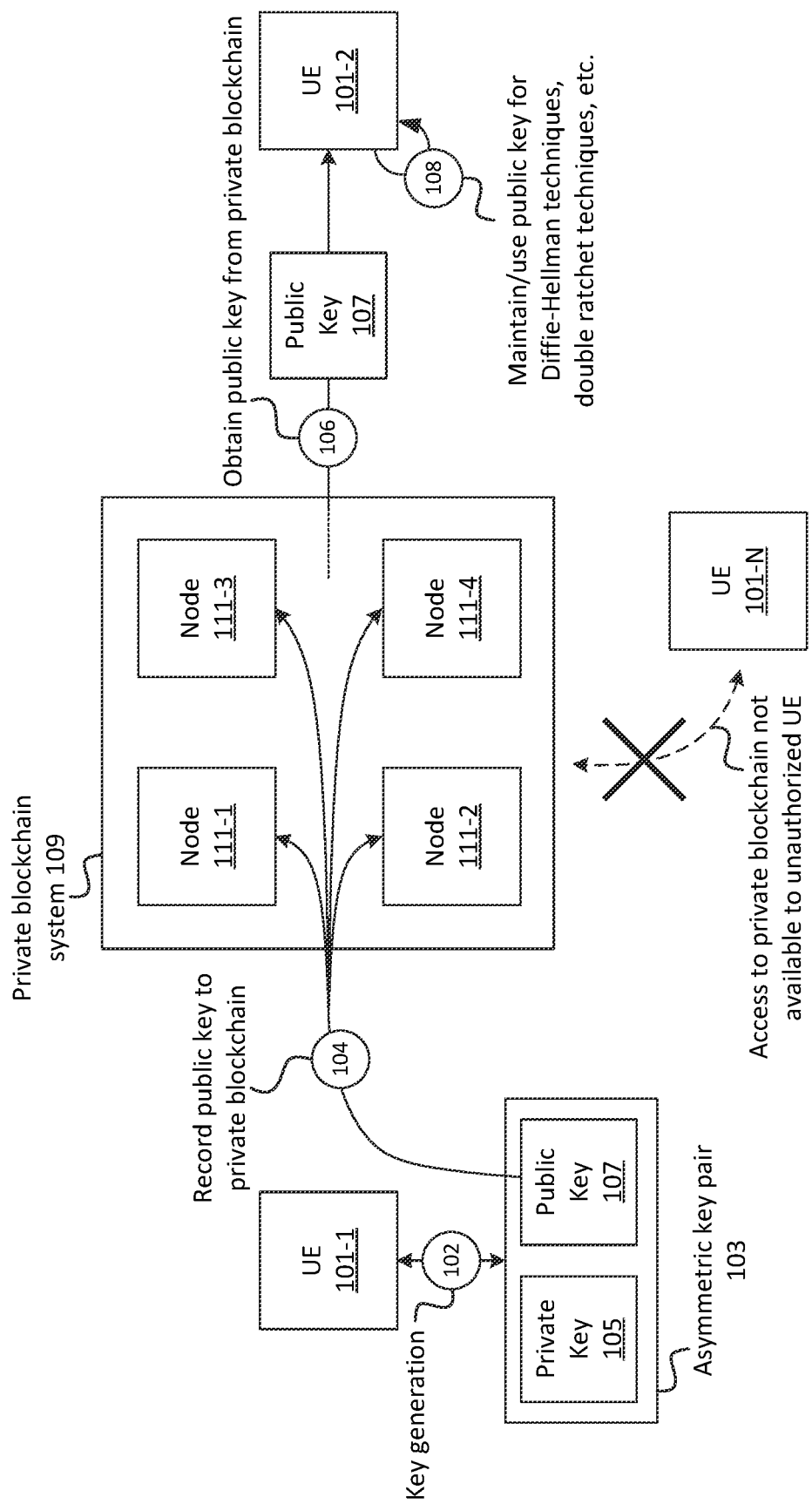
FIG. 1 illustrates an example overview of one or more embodiments described herein.

As shown in FIG. 1, a first entity, such as User Equipment ("UE") 101-1, may generate (at 102) a set of keys. The set of keys may be, and/or may include, asymmetric key pair 103, which may include private key 105 and public key 107. Private key 105 may be used to decrypt information encrypted by public key 107, may be used in a double ratchet and/or Signal Protocol technique, and/or may be used for other suitable purposes. UE 101-1 may securely store private key 105, such as in a local storage device associated with UE 101-1, in a private key store, in a Universal Integrated Circuit Card ("UICC"), and/or in some other secure location.

As further shown, UE 101-1 may record (at 104) the public key to a blockchain system, such as private blockchain system 109. As noted above, private blockchain system 109 may be "private," in that only authorized entities (e.g., authorized UEs, authorized users, etc.) may have access to the information stored in private blockchain system 109. The information stored in private blockchain system 109 may be organized as "blocks," where one particular record corresponds to one particular block, and/or where one block includes multiple records. A block may also include a reference to one or more other blocks (e.g., a "previous" block and/or a "next" block), such that a group of blocks and their associated references may form a "chain" of blocks. Further, private blockchain system 109 may include a set of nodes 111 that form a consensus regarding the blocks of which the blockchain is comprised, thus preventing unauthorized changes to the information stored in the blockchain, as well as resiliency in case any particular node 111 is compromised or otherwise becomes unavailable. In some embodiments, nodes 111 may each be implemented by a respective UE 101, such as a mobile telephone, a workstation computer, a tablet, an Internet of Things ("IoT") device, and/or other suitable type of device. While shown in the figure as being "external" to private blockchain system

109, in practice, UE 101-1 may be, and/or may implement, a particular node 111 associated with private blockchain system 109.

When recording the public key to private blockchain system 109, UE 101-1 may provide an identifier associated with UE 101-1 and/or other identifying information based on which the public key may be retrieved by an entity that may use the public key. For example, the record may include an Internet Protocol ("IP") address associated with UE 101-1, a device name, a user name, a Session Initiation Protocol ("SIP") address, and/or some other suitable information associated with UE 101-1.

Additionally, or alternatively, the record may include a session identifier, which may identify a communication session between UE 101-1 and another UE, such as UE 101-2. For example, UE 101-1 and UE 101-2 may be engaged in a secure messaging session, in which UE 101-1 and UE 101-2 exchange encrypted messages. The messaging session may be associated with a double ratchet technique, a Signal Protocol technique, and/or other type of technique in which UE 101-1 and UE 101-2 provide public keys to each other.

Briefly, for example, for each message sent between UE 101-1 and UE 101-2, a new public key may be generated (e.g., in an alternating fashion, where UE 101-1 generates a public key for a first message, UE 101-2 generates a public key for a second message, UE 101-1 generates a public key for a third message, and so on). As described below, these alternating shared public keys may serve as a first "ratchet" in a double ratchet technique to ensure security of the encrypted communications. For example, as discussed below, the public keys may be used to generate symmetric send and/or receive keys, which may be used to encrypt and/or decrypt communications between UE 101-1 and UE 101-2 without transmitting the send and/or receive keys between each other.

Private blockchain system 109 is illustrated as including four nodes 111-1, 111-2, 111-3, and 111-4. In practice, private blockchain system 109 may include fewer nodes and/or additional nodes. Private blockchain system 109 may, in some embodiments, be associated with one or more suitable authentication mechanisms whereby only authorized devices or systems are able to participate as nodes 111 of private blockchain system 109. For example, as discussed herein, particular users or UEs 101 may be specified or automatically identified (e.g., based on an address book or contact list associated with a particular UE 101 that is authorized to access private blockchain system 109 and/or some other suitable technique). As such, unauthorized devices, such as UE 101-N, may not be able to access information stored in private blockchain system 109 and/or may not be able to participate as a node 111 of private blockchain system 109. Further, as the nodes 111 of private blockchain system 109 may only include trusted devices, the integrity of the information stored by private blockchain system 109 may be enhanced, as the likelihood of a compromise or attack of private blockchain system 109 may be reduced or eliminated. Further, the recording and/or accessing of private blockchain system 109 may be private with respect to external devices that do not have access to private blockchain system 109.

In some embodiments, separate private blockchain systems 109 may be established for discrete groups, such as messaging or conversation groups (e.g., where a first communication session includes a first set of participants and is associated with a first private blockchain system 109, and where a second communication session includes a second set of participants and is associated with a second private blockchain system 109). In some embodiments, a single private blockchain system 109 may be associated with multiple communication sessions, where keys associated with a given communication session may be protected by a set of smart contracts or other security mechanisms that are accessible only to participants in the communication session.

Once recorded to private blockchain system 109, public key 107 may be obtained by UE 101-2 and/or another device or system to which the information stored in private blockchain system 109 is available. For example, as noted above, UE 101-2 may be a UE with which UE 101-1 is engaged in a communication session via which UE 101-1 and UE 101-2 exchange encrypted communications. UE 101-2 may identify a record stored in private blockchain system 109 that includes the identifier associated with UE 101-1, a communication session associated with UE 101-1 and UE 101-2, and/or some other suitable identifier. In some embodiments, UE 101-2 may be a node 111 of private blockchain system 109, and may maintain a full copy of the blockchain stored by private blockchain system 109. In some embodiments, private blockchain system 109 may implement or be communicatively coupled to a search system, which may provide records that match a query. For example, UE 101-2 may query private blockchain system 109 for the identifier associated with UE 101-1 and/or a communication session with UE 101-1, and private blockchain system 109 may return one or more blocks that include the identifier associated with UE 101-1 and/or the communication session. In some embodiments, private blockchain system 109 may return, and/or UE 101-2 may otherwise identify, the latest (e.g., most current) block matching the query. In this manner, in situations where UE 101-1 has provided multiple public keys to private blockchain system 109 over time, UE 101-2 may be able to retrieve and/or otherwise identify the newest public key. Identifying the newest public key may be useful in a double ratchet technique, a Signal Protocol technique, and/or some other technique in which an updated public key is used for each message between UE 101-1 and UE 101-2. In some embodiments, public keys may be provided with sequence numbers or other information, based on which public keys associated with communications received in a non-sequential manner (e.g., out of order) may be identified.

In some embodiments, the public key may be provided as part of a Diffie-Hellman exchange or some other suitable technique in which public keys associated with multiple UEs 101 are exchanged amongst each other. UE 101-2 may accordingly maintain and/or use (at 108) the received public key for a double ratchet technique, a Signal Protocol technique, and/or in some other technique that involves a Diffie-Hellman key exchange or other type of key exchange procedure.

Figure 2:
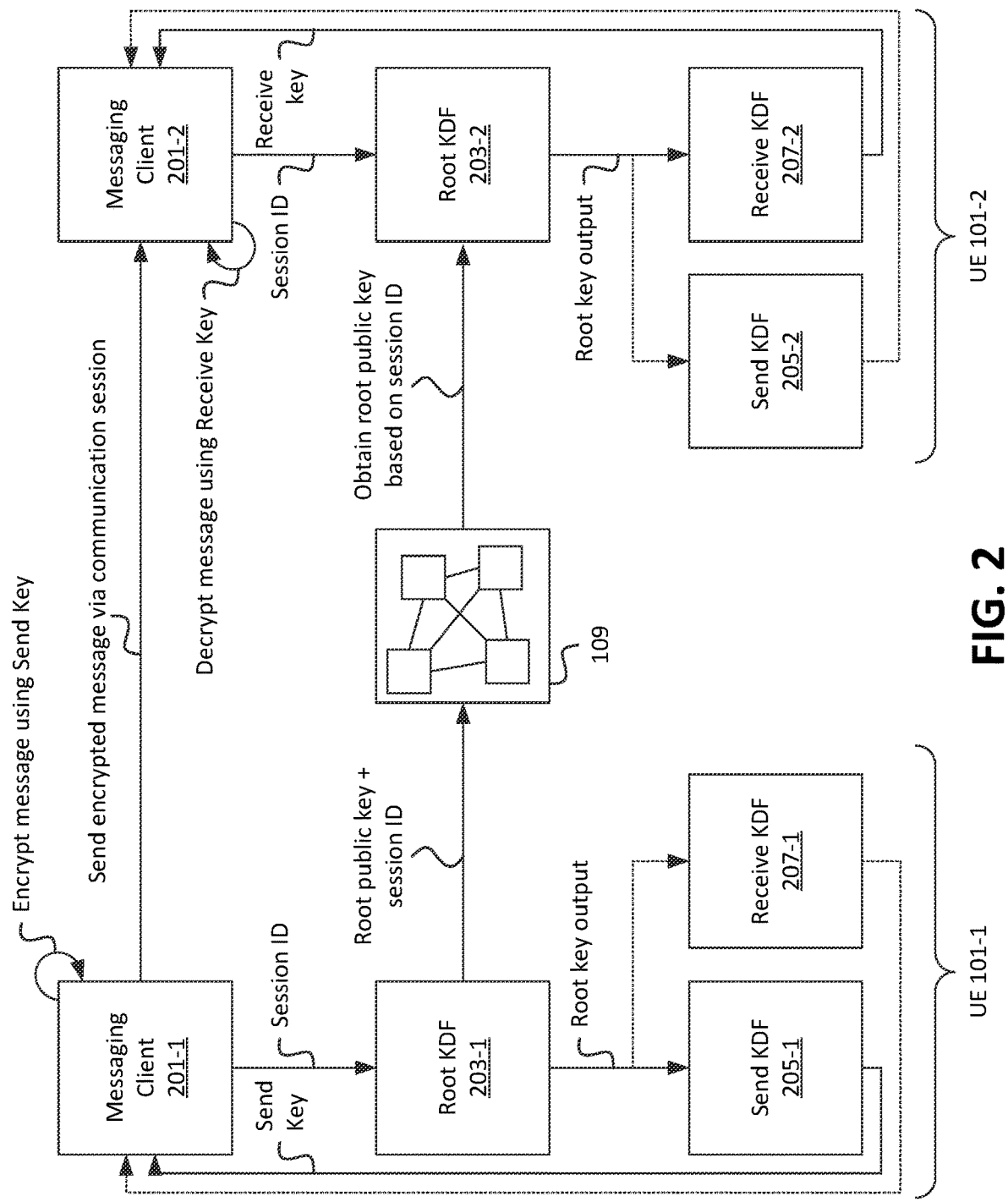
FIG. 2 illustrates an example of using a shared public key via a private blockchain system, in accordance with some embodiments, in a communication that utilizes double ratchet techniques to secure communications.

FIG. 2 illustrates an example of using a shared public key (e.g., shared via private blockchain system 109, in accordance with some embodiments) in a communication technique that utilizes double ratchet techniques to secure communications between UE 101-1 and UE 101-2. As shown, UE 101-1 and UE 101-2 may each include a respective messaging client 201, which may send and/or receive encrypted communications. For example, messaging client 201-1, associated with UE 101-1, may encrypt communications based on techniques described herein, and may send the encrypted communications to messaging client 201-2 associated with UE 101-2. Messaging client 201-2 may receive encrypted communications from UE 101-1 (e.g., from messaging client 201-1), may decrypt the communications based on techniques described herein, and may present the decrypted communications (e.g., via a graphical user interface ("GUI") or other suitable manner of presentation). Similarly, messaging client 201-2, associated with UE 101-2, may encrypt communications based on techniques described herein, and may send the encrypted communications to messaging client 201-1 associated with UE 101-1. Messaging client 201-1 may receive encrypted communications from UE 101-2 (e.g., from messaging client 201-2), may decrypt the communications based on techniques described herein, and may present the decrypted communications (e.g., via a GUI or other suitable manner of presentation).

The encryption and/or decryption by messaging client 201-1 and/or messaging client 201-2 may be performed using a symmetric key that is generated based on a double ratchet technique, a Signal Protocol technique, and/or other suitable technique. For example, as discussed herein, the symmetric key may be used by a sender (e.g., UE 101-1, in this example) to encrypt a communication, and may be used by a recipient (e.g., UE 101-2, in this example) to decrypt the communication. The symmetric keys may be generated by respective Send Key Derivation Function ("KDF") 205 and/or Receive KDF 207 associated with the sender and/or recipient. The symmetric keys may be generated based on one or more root keys provided by Root KDF 203 to Send KDF 205 and/or Receive KDF 207. For example, Root KDF 203-1 may provide a root key output based on a public key and a private key to Send KDF 205-1, which may generate a send key (e.g., based on the root key output and one or more private keys)s which may be used to encrypt communications to be sent by messaging client 201-1. The private key based on which the root key output is generated may be privately maintained by UE 101-1 (e.g., not sent to UE 101-2), while the public key may be shared with UE 101-2 via private blockchain system 109, in accordance with embodiments described herein. Root KDF 203-1 may provide a different root key output for each message sent and/or received by messaging client 201-1, based on a public key exchange (e.g., via a Diffie-Hellman key exchange or other suitable procedure) with UE 101-2, which may be performed each time a message is sent by UE 101-1 and/or UE 101-2.

For example, when UE 101-1 sends a message, Root KDF 203-1 may generate a root key output, and may further output a public key based on which the root key output was generated, to private blockchain system 109. As discussed above, the public key may be provided with a session identifier (e.g., to identify a communication session between messaging client 201-1 and messaging client 201-2), an identifier associated with UE 101-1, an identifier associated with UE 101-2, and/or other suitable information based on which UE 101-2 may identify that the public key recorded to private blockchain system 109 is associated with the communication session between UE 101-1 and UE 101-2.

UE 101-2 (e.g., Root KDF 203-2) may obtain the root public key from private blockchain system 109 based on the session identifier or other suitable identifier, and may generate a root key output based on the obtained public key and a private key (e.g., a different private key than the private key used by Root KDF 203-1 to encrypt the communication). As noted above, using private blockchain system 109 to exchange public keys may maintain the integrity of the keys, such as by preventing malicious actors from modifying or "spoofing" keys. Further, using private blockchain system 109 may aid in situations where a given UE 101 (e.g., UE 101-2, in this example) is "offline" or is otherwise unavailable to receive public keys from another UE 101 (e.g., UE 101-1, in this example) at the time that the other UE 101 outputs the public keys.

Root KDF 203-2 may provide the root key output to Receive KDF 207-2, which may generate a receive key based on the root key output and one or more private keys. In accordance with the double ratchet techniques, Signal Protocol techniques, etc., the receive key generated by Receive KDF 207-2 may be the same as the send key output generated by Send KDF 205-1. In this manner, these respective send and receive keys may be an identical symmetric key that may be used to encrypt and decrypt communications, such as the encrypted communication sent by messaging client 201-1 to messaging client 201-2 in this example.

While an example is provided here in the context of UE 101-1 encrypting a communication, sending the encrypted communication to UE 101-2, and UE 101-2 decrypting the communication, similar techniques may be performed (e.g., iteratively) for communications encrypted and sent by UE 101-2 to UE 101-1, as denoted by the dashed lines in FIG. 2. For example, Root KDF 203-2 may generate a root key pair, output a public key of the root key pair to private blockchain system 109 for retrieval by UE 101-1, generate a root key output based on the root key pair, and provide the root key output to Send KDF 205-2. Send KDF 205-2 may generate a send key based on the root key output and one or more private keys, and messaging client 201-2 may encrypt a communication based on the send key. Further, Root KDF 203-1 may retrieve the public key from private blockchain system 109, generate a root key output based on the retrieved public key and one or more private keys, and provide the root key output to Receive KDF 207-1. Receive KDF 207-1 may generate a receive key based on the root key output and one or more private keys, and messaging client 201-1 may decrypt a communication received from messaging client 201-2, as encrypted based on a matching send key.

Figure 3:
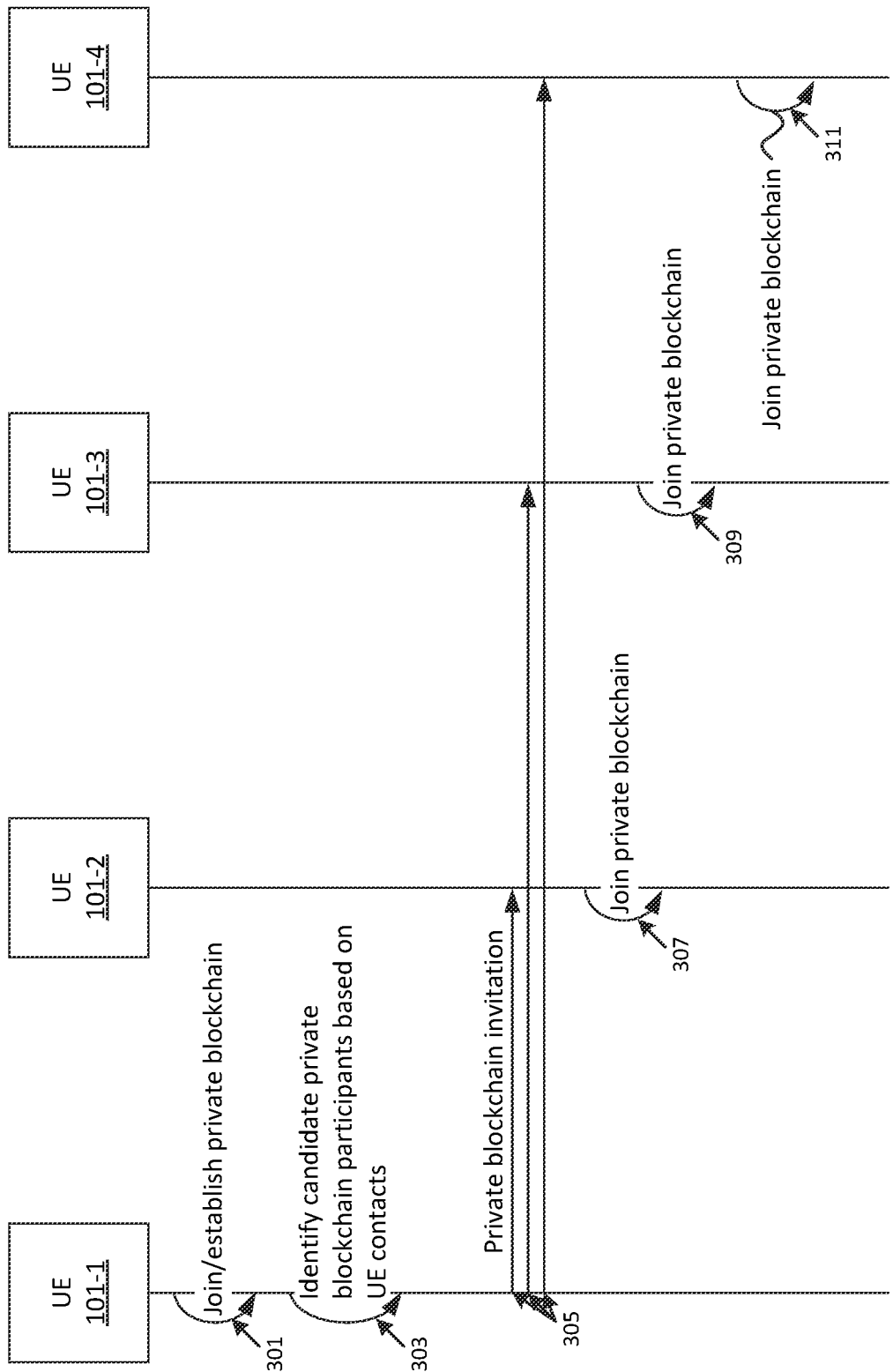
FIG. 3 illustrates an example of establishing a private blockchain system, in accordance with one or more embodiments.

As noted above, private blockchain system 109 may be a "private" blockchain, in that only approved UEs 101 (or other suitable devices or systems) may participate in private blockchain system 109 as nodes 111 of private blockchain system 109. In some embodiments, eligible participants may be identified based on an automated determination of contacts associated with one or more participant nodes 111 of private blockchain system 109, and/or some other suitable technique. For example, as shown in FIG. 3, UE 101-1 may establish (at 301) and/or join private blockchain system 109. For example, UE 101-1 may establish a new private blockchain system 109 by generating a "genesis" block, and/or may join an existing private blockchain system 109. In some embodiments, UE 101-1 may communicate with one or more devices or systems that facilitate the establishment of private blockchain system 109.

UE 101-1 may further automatically identify (at 303) candidate participants (e.g., nodes 111 for private blockchain system 109, devices or systems that are authorized to access information stored in private blockchain system 109, or the like). For example, UE 101-1 may identify contacts in an address book, call history, and/or other type of contact list associated with UE 101-1. Additionally, or alternatively, UE 101-1 and/or some other device or system may utilize artificial intelligence/machine learning ("AI/ML") techniques or other suitable techniques to identify UEs 101 with which UE 101-1 has communicated.

UE 101-1 may output (at 305) an invitation to join (e.g., as a node 111 and/or as an authorized viewer of information stored in private blockchain system 109) to identified UEs 101-2, 101-3, and 101-4. In some embodiments, UE 101-1 (e.g., an application or application programming interface ("API") associated with UE 101-1) may communicate with contacts in a contact list associated with UE 101-1 (e.g., where the contacts include UEs 101-2, 101-3, and 101-4 in this example) via one or more suitable messaging or other types of communication applications, and may identify particular ones of the contacts participate in a key escrow or other type of key exchange. UE 101-1 may output an invitation to private blockchain system 109 to the identified contacts via the messaging or other communication applications and/or some other suitable communication pathway. In some embodiments, the invitation may include identifying information associated with UE 101-1, such as an IP address associated with UE 101-1, MDN associated with UE 101-1, IMEI associated with UE 101-1, IMSI associated with UE 101-1, and/or some other suitable identifier.

UEs 101-2, 101-3, and 101-4 may accordingly join (at 307, 309, and 311, respectively) private blockchain system 109. For example, such UEs 101-2, 101-3, and 101-4 may register as nodes 111 using information provided (at 305) by UE 101-1, and/or may access information stored in private blockchain system 109 using such information. In this manner, private blockchain system 109 may be "private" inasmuch as UEs 101 which were not invited (at 305) to private blockchain system 109 may not access the information stored in private blockchain system 109.

Figure 4:
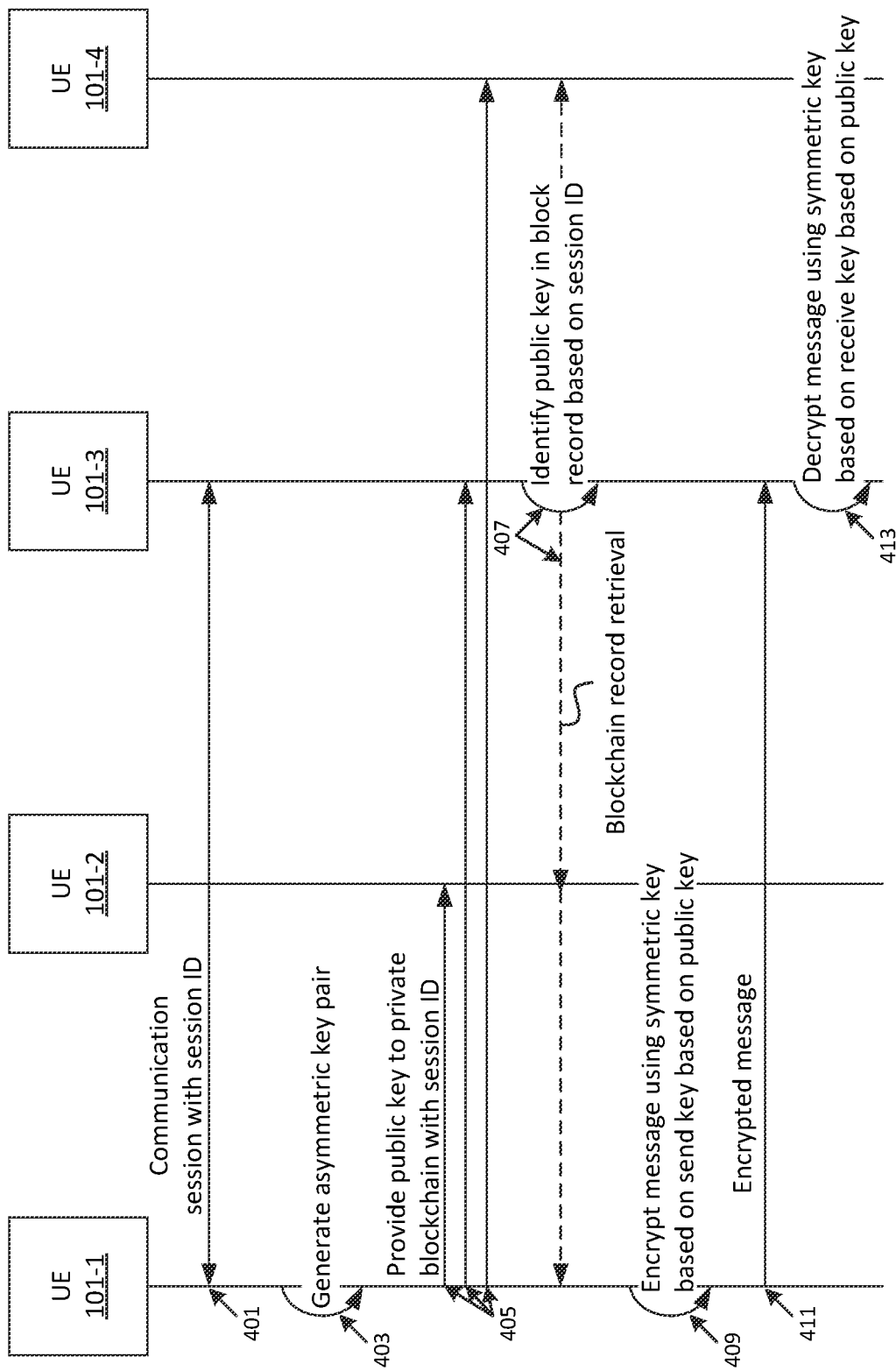
FIG. 4 illustrates an example of using a shared public key via a private blockchain system, in accordance with some embodiments, in a communication that utilizes double ratchet techniques to secure communications.

FIG. 4 illustrates an example of the use of private blockchain system 109 to exchange public keys in the encryption and/or decryption of secure communications between UEs 101 participating in a secure communication session. In this example, UEs 101-1, 101-2, 101-3, and 101-4 may be nodes 111 of private blockchain system 109. Further, UEs 101-1 and 101-3 may be participants in a communication session (e.g., via respective messaging clients 201 associated with UEs 101-1 and 101-3). For example, UE 101-1 and UE 101-3 may establish (at 401) a secure communication session using any suitable session establishment technique or protocol. The communication session may be associated with a session identifier or other suitable mechanism by which UEs 101-1 and/or 101-3 may identify the communication session. For example, an initiator of the communication session may generate or otherwise determine an identifier for the communication session, and/or UEs 101-1 and 101-3 may otherwise negotiate or determine an identifier for the communication session.

UE 101-1 may further generate (at 403) an asymmetric key pair, which may be used as part of a double ratchet technique, a Signal Protocol technique, and/or some other encryption technique used to secure communications between UEs 101-1 and 101-3. For example, the asymmetric key pair generated (at 403) by UE 101-1 may include a public key used in the generation of a send key used to encrypt communications sent to UE 101-3. While not explicitly shown in FIG. 4, UE 101-3 may also generate one or more keys that may be used in the encryption and/or decryption of messages between UEs 101-1 and 101-3, in accordance with the double ratchet technique, Signal Protocol technique, and/or other suitable encryption technique.

UE 101-1 may further provide (at 405) the public key of the generated asymmetric key pair to private blockchain system 109. As noted above, UEs 101-1, 101-2, 101-3, and 101-4 may be nodes 111 of private blockchain system 109. In other examples, UE 101-3 (e.g., a participant in the secure communication session) may not be a node 111 of private blockchain system 109, and thus UE 101-1 may not directly provide (at 405) the public key to UE 101-3. When providing (at 405) the public key to private blockchain system 109, UE 101-1 may include the session identifier of the communication session between UEs 101-1 and 101-3, and/or some other suitable identifier based on which UE 101-3 may identify (at 407) the public key provided by UE 101-1.

For example, as discussed above, UE 101-3 may retrieve (at 407) the public key from private blockchain system 109 based on identifying a record in private blockchain system 109 that includes the session identifier or other suitable identifier associated with UEs 101-1 and/or 101-3. In situations where multiple blocks exist with the session identifier, UE 101-3 may identify a latest (e.g., newest) block. For example, in accordance with the double ratchet and/or Signal Protocol techniques, a new public key may be provided each time a message is sent and/or received by UE 101-1 and/or UE 101-3. As such, identifying a latest public key associated with the communication session between UEs 101-1 and 101-3 may facilitate the secure communications according to the double ratchet and/or Signal Protocol techniques.

UE 101-1 may further encrypt (at 409) a message for UE 101-3 using a symmetric key (e.g., a send key, as similarly discussed above) that UE 101-1 generates based on the public key, one or more private keys, and/or one or more KDFs (e.g., Send KDF 205). UE 101-1 may proceed to output (at 411) the encrypted message to UE 101-3. UE 101-3 may decrypt (at 413) the message using a symmetric key (e.g., the same symmetric key as UE 101-1 used to encrypt (at 409) the message), which may be generated by one or more KDFs (e.g., Receive KDF 207) based on the retrieved (at 407) public key.

While FIG. 4 shows an example of one message being sent from UE 101-1 to UE 101-3, similar techniques may be employed when UE 101-1 sends additional messages to UE 101-3, and/or when UE 101-3 sends messages to UE 101-1. For example, UE 101-3 may generate a subsequent asymmetric key pair that is derived from and/or is otherwise based on the retrieved (at 407) public key, and may output a public key of the subsequent asymmetric key pair to private blockchain system 109. UE 101-3 may utilize this subsequently generated public key to generate a send key, and UE 101-1 may utilize this subsequently generated public key, retrieved from private blockchain system 109, to generate a receive key, as described above.

Figure 5:
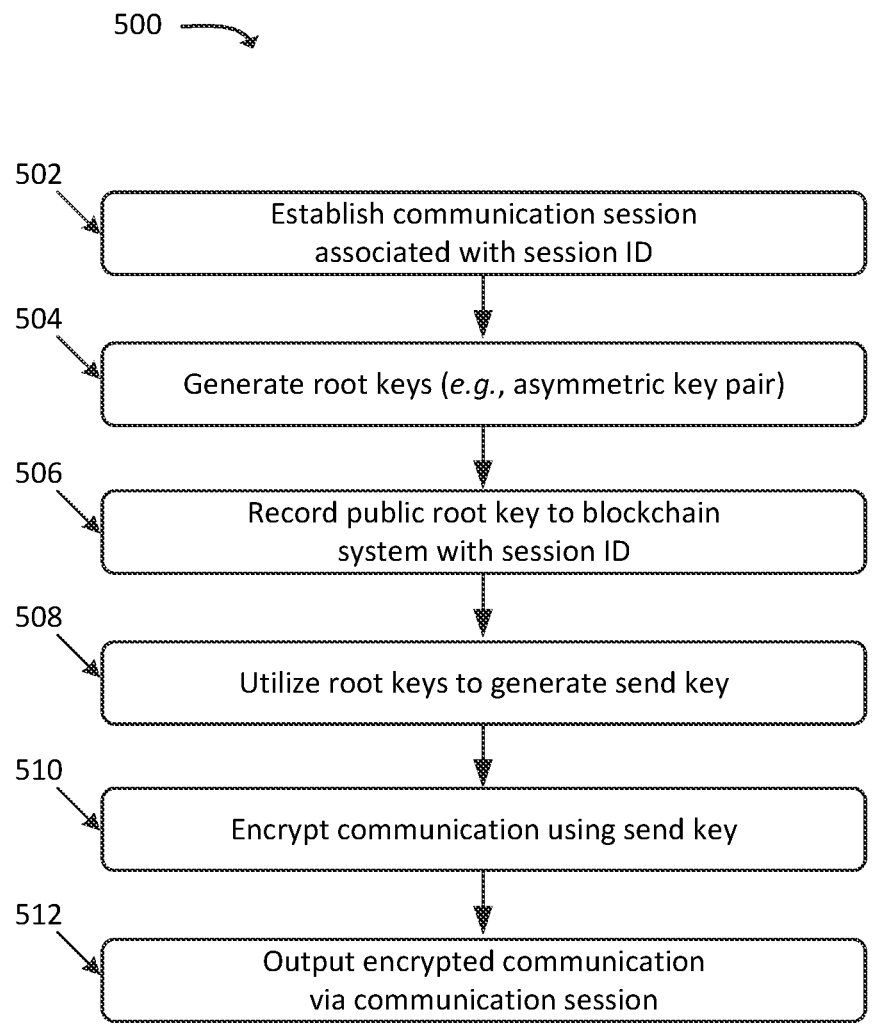
FIGS. 5 and 6 illustrate example processes for using a shared public key via a private blockchain system, in accordance with some embodiments, in a communication that utilizes double ratchet techniques to secure communications.
Figure 6:
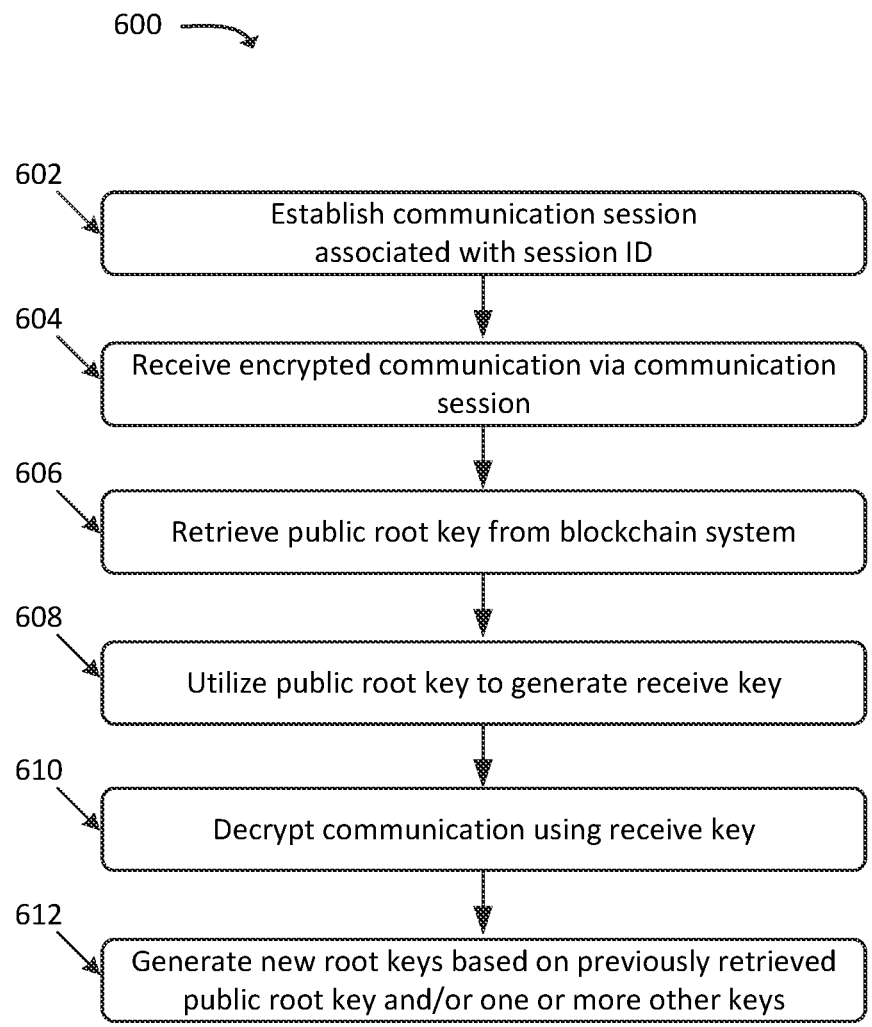

FIGS. 5 and 6 illustrate example processes 500 and 600, respectively, for utilizing blockchain techniques to share and/or exchange public keys. In the examples provided herein, the key exchange may be part of a Diffie-Hellman key exchange, a key exchange portion of a Signal Protocol technique, a key exchange portion of a double ratchet technique, and/or some other suitable secure exchange of public keys. In some embodiments, some or all of process 500 and/or 600 may be performed by one or more UEs 101 (e.g., UEs 101 engaged in a communication session with each other and/or one or more other UEs 101). In some embodiments, one or more other devices may perform some or all of processes 500 and/or 600 in concert with, and/or in lieu of, UE 101.

As shown, process 500 may include establishing (at 502) a communication session with one or more UEs 101. The communication session may be associated with a session identifier or other identifier based on which participant UEs 101 of the communication session may identify messages exchanged with one another and/or public keys, associated with the communication session, recorded to private blockchain system 109 in accordance with embodiments described herein.

Process 500 may further include generating (at 504) a set of root keys, which may include an asymmetric key pair. For example, as discussed above, the root keys may include a private key which may be maintained securely by UE 101, and a public key which may ultimately be shared with one or more other UEs 101 (e.g., another participant in the communication session).

Process 500 may additionally include recording (at 506) the public root key (e.g., the public key of the asymmetric key pair generated at 504) to private blockchain system 109. For example, UE 101 may output the public key to private blockchain system 109, and private blockchain system 109 may propagate the information to one or more nodes 111 of private blockchain system 109. Nodes 111 may form a consensus regarding the addition of the provided public key to one or more records of private blockchain system 109, and may maintain an immutable record of the provided public key. In some embodiments, the record may include a timestamp, a block identifier, and/or other mechanism by which a recency or age of the record may be determined. As similarly described above, the record may further include a communication session identifier, an identifier of UE 101 from which the information was received, and/or other suitable information.

Process 500 may also include utilizing (at 508) the root keys to generate a send key. For example, as discussed above, Root KDF 203 may utilize the root keys (e.g., including the root public key, as well as the root private key and/or one or more other keys) to generate a root key output, and may provide the root key output to another KDF, such as Send KDF 205. Send KDF 205 may generate a send key based on the root key output from Root KDF 203 and/or based on one or more other keys or functions. As discussed above, the generated send key may be a symmetric key that may be identical to a receive key generated by a recipient of the public key, based on a Signal Protocol technique, a double ratchet technique, etc.

Process 500 may further include encrypting (at 510) a communication using the send key. Process 500 may additionally include outputting (at 512) the encrypted communication via the communication session, such as to a UE 101 with which the communication session was established (at 502).

As shown in FIG. 6, process 600 may include establishing (at 602) a communication session. For example, as similarly discussed above, UE 101 may establish a communication session with one or more other UEs 101. The communication session may be associated with a suitable identifier, based on which the UEs 101 participating in the communication session may identify communications associated with the communication session, including encrypted messages, public keys, and/or other information.

Process 600 may further include receiving (at 604) an encrypted communication via the communication session. For example, the communication may have been encrypted using one or more KDFs, where the input to the one or more KDFs include the public root key and one or more other keys (e.g., one or more private keys, one or more KDF outputs, etc.).

Process 600 may further include retrieving (at 606) a public root key from private blockchain system 109. In some embodiments, private blockchain system 109 and/or one or more devices or systems communicatively coupled to private blockchain system 109 may "push" the public root key to private blockchain system 109. For example, the one or more devices or systems may identify a particular block that includes an identifier of UE 101 (e.g., where the particular block includes the identifier of UE 101 and a public root key), may identify a particular block that includes an identifier of the communication session (e.g., where the particular block includes the identifier of the communication session and a public root key), etc. Additionally, or alternatively, UE 101 may "pull" the information from private blockchain system 109 based on a suitable identifier (e.g., an identifier of UE 101, an identifier of the communication session, etc.).

Process 600 may additionally include utilizing (at 608) the public root key to generate a receive key. For example, as discussed above, UE 101 may utilize one or more KDFs, such as Root KDF 203 and/or Receive KDF 207, to generate a receive key. The receive key may be a symmetric key with respect to a key used to encrypt a communication received by UE 101 via the communication session. For example, as discussed above, the receive key may be identical to a send key used by a sender of the communication, where the send key was also generated based on one or more KDFs and at least the public root key. For example, the sender and UE 101 may perform double ratchet techniques, Signal Protocol techniques, or the like, to respectively encrypt and decrypt the communication, without transmitting or sharing the symmetric key itself.

Process 600 may further include decrypting (at 610) the communication, received via the communication session, using the generated receive key. For example, UE 101 may apply one or more functions to decrypt the receive message using the receive key, which, as discussed above, may be the same as a send key used to encrypt the communication.

Process 600 may additionally include generating (at 612) a new set of root keys based on the previously retrieved public root key and one or more other root keys. For example, once UE 101 generates the receive key, the public root key (retrieved at 606) may be discarded and/or not used for sending messages from UE 101. In some situations, UE 101 may maintain the public root key and apply techniques described above to decrypt subsequent communications from the sender in situations where the sender sends multiple communications in a row without any intervening messages from UE 101. The new set of root keys may be generated based on the receive key (generated at 608), the public root key (retrieved at 606), and/or one or more other suitable keys. UE 101 may then proceed to output the newly generated public root key to private blockchain system 109, as similarly described above with respect to operation 506 of process 500, may generate (e.g., similar to operation 508) a new send key based on the newly generated public root key, etc.

Figure 7:
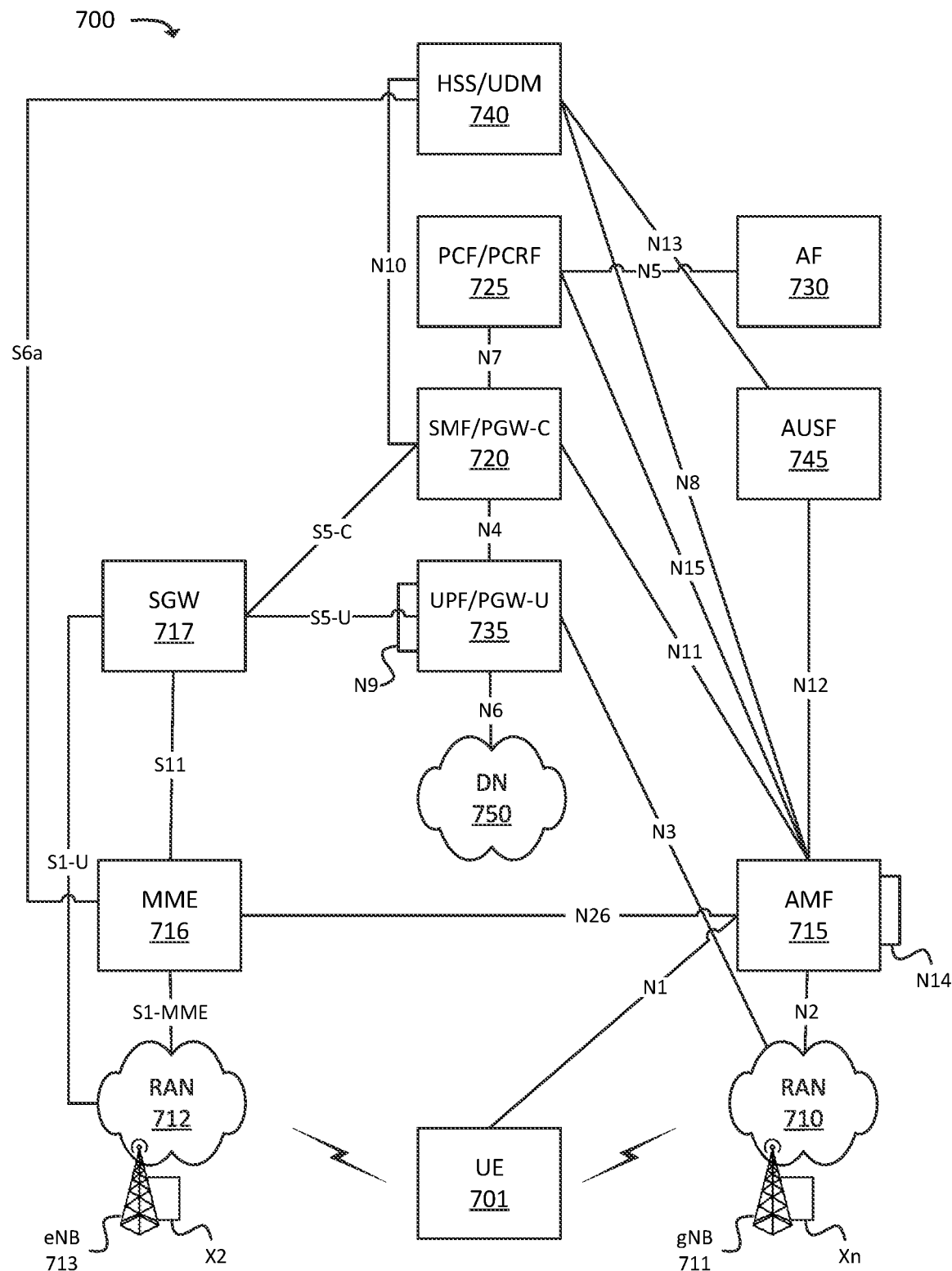
FIG. 7 illustrates an example environment in which one or more embodiments, described herein, may be implemented.

FIG. 7 illustrates an example environment 700, in which one or more embodiments may be implemented. In some embodiments, environment 700 may correspond to a Fifth Generation ("5G") network, and/or may include elements of a 5G network. In some embodiments, environment 700 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 700 may include UE 701, RAN 710 (which may include one or more Next Generation Node Bs ("gNBs") 711), RAN 712 (which may include one or more one or more evolved Node Bs ("eNBs") 713), and various network functions such as Access and Mobility Management Function ("AMF") 715, Mobility Management Entity ("MME") 716, Serving Gateway ("SGW") 717, Session Management Function ("SMF")/Packet Data Network ("PDN") Gateway ("PGW")-Control plane function ("PGW-C") 720, Policy Control Function ("PCF")/Policy Charging and Rules Function ("PCRF") 725, Application Function ("AF") 730, User Plane Function ("UPF")/PGW-User plane function ("PGW-U") 735, Home Subscriber Server ("HSS")/Unified Data Management ("UDM") 740, and Authentication Server Function ("AUSF") 745. Environment 700 may also include one or more networks, such as Data Network ("DN") 750.

The example shown in FIG. 7 illustrates one instance of each network component or function (e.g., one instance of SMF/PGW-C 720, PCF/PCRF 725, UPF/PGW-U 735, HSS/UDM 740, and/or AUSF 745). In practice, environment 700 may include multiple instances of such components or functions. For example, in some embodiments, environment 700 may include multiple "slices" of a core network, where each slice includes a discrete set of network functions (e.g., one slice may include a first instance of SMF/PGW-C 720, PCF/PCRF 725, UPF/PGW-U 735, HSS/UDM 740, and/or AUSF 745, while another slice may include a second instance of SMF/PGW-C 720, PCF/PCRF 725, UPF/PGW-U 735, HSS/UDM 740, and/or AUSF 745). The different slices may provide differentiated levels of service, such as service in accordance with different Quality of Service ("QoS") parameters.

The quantity of devices and/or networks, illustrated in FIG. 7, is provided for explanatory purposes only. In practice, environment 700 may include additional devices and/or networks, fewer devices and/or networks, different devices and/or networks, or differently arranged devices and/or networks than illustrated in FIG. 7. For example, while not shown, environment 700 may include devices that facilitate or enable communication between various components shown in environment 700, such as routers, modems, gateways, switches, hubs, etc. Alternatively, or additionally, one or more of the devices of environment 700 may perform one or more network functions described as being performed by another one or more of the devices of environment 700. Devices of environment 700 may interconnect with each other and/or other devices via wired connections, wireless connections, or a combination of wired and wireless connections. In some implementations, one or more devices of environment 700 may be physically integrated in, and/or may be physically attached to, one or more other devices of environment 700.

UE 701 may include a computation and communication device, such as a wireless mobile communication device that is capable of communicating with RAN 710, RAN 712, and/or DN 750. UE 701 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Machine-to-Machine ("M2M") device, or another type of mobile computation and communication device. UE 701 may send traffic to and/or receive traffic (e.g., user plane traffic) from DN 750 via RAN 710, RAN 712, and/or UPF/PGW-U 735.

RAN 710 may be, or may include, a 5G RAN that includes one or more base stations (e.g., one or more gNBs 711), via which UE 701 may communicate with one or more other elements of environment 700. UE 701 may communicate with RAN 710 via an air interface (e.g., as provided by gNB 711). For instance, RAN 710 may receive traffic (e.g., voice call traffic, data traffic, messaging traffic, signaling traffic, etc.) from UE 701 via the air interface, and may communicate the traffic to UPF/PGW-U 735, and/or one or more other devices or networks. Similarly, RAN 710 may receive traffic intended for UE 701 (e.g., from UPF/PGW-U 735, AMF 715, and/or one or more other devices or networks) and may communicate the traffic to UE 701 via the air interface.

RAN 712 may be, or may include, a LTE RAN that includes one or more base stations (e.g., one or more eNBs 713), via which UE 701 may communicate with one or more other elements of environment 700. UE 701 may communicate with RAN 712 via an air interface (e.g., as provided by eNB 713). For instance, RAN 710 may receive traffic (e.g., voice call traffic, data traffic, messaging traffic, signaling traffic, etc.) from UE 701 via the air interface, and may communicate the traffic to UPF/PGW-U 735, and/or one or more other devices or networks. Similarly, RAN 710 may receive traffic intended for UE 701 (e.g., from UPF/PGW-U 735, SGW 717, and/or one or more other devices or networks) and may communicate the traffic to UE 701 via the air interface.

AMF 715 may include one or more devices, systems, Virtualized Network Functions ("VNFs"), etc., that perform operations to register UE 701 with the 5G network, to establish bearer channels associated with a session with UE 701, to hand off UE 701 from the 5G network to another network, to hand off UE 701 from the other network to the 5G network, manage mobility of UE 701 between RANs 710 and/or gNBs 711, and/or to perform other operations. In some embodiments, the 5G network may include multiple AMFs 715, which communicate with each other via the N14 interface (denoted in FIG. 7 by the line marked "N14" originating and terminating at AMF 715).

MME 716 may include one or more devices, systems, VNFs, etc., that perform operations to register UE 701 with the EPC, to establish bearer channels associated with a session with UE 701, to hand off UE 701 from the EPC to another network, to hand off UE 701 from another network to the EPC, manage mobility of UE 701 between RANs 712 and/or eNBs 713, and/or to perform other operations.

SGW 717 may include one or more devices, systems, VNFs, etc., that aggregate traffic received from one or more eNBs 713 and send the aggregated traffic to an external network or device via UPF/PGW-U 735. Additionally, SGW 717 may aggregate traffic received from one or more UPF/PGW-Us 735 and may send the aggregated traffic to one or more eNBs 713. SGW 717 may operate as an anchor for the user plane during inter-eNB handovers and as an anchor for mobility between different telecommunication networks or RANs (e.g., RANs 710 and 712).

SMF/PGW-C 720 may include one or more devices, systems, VNFs, etc., that gather, process, store, and/or provide information in a manner described herein. SMF/PGW-C 720 may, for example, facilitate the establishment of communication sessions on behalf of UE 701. In some embodiments, the establishment of communications sessions may be performed in accordance with one or more policies provided by PCF/PCRF 725.

PCF/PCRF 725 may include one or more devices, systems, VNFs, etc., that aggregate information to and from the 5G network and/or other sources. PCF/PCRF 725 may receive information regarding policies and/or subscriptions from one or more sources, such as subscriber databases and/or from one or more users (such as, for example, an administrator associated with PCF/PCRF 725).

AF 730 may include one or more devices, systems, VNFs, etc., that receive, store, and/or provide information that may be used in determining parameters (e.g., quality of service parameters, charging parameters, or the like) for certain applications.

UPF/PGW-U 735 may include one or more devices, systems, VNFs, etc., that receive, store, and/or provide data (e.g., user plane data). For example, UPF/PGW-U 735 may receive user plane data (e.g., voice call traffic, data traffic, etc.), destined for UE 701, from DN 750, and may forward the user plane data toward UE 701 (e.g., via RAN 710, SMF/PGW-C 720, and/or one or more other devices). In some embodiments, multiple UPFs 735 may be deployed (e.g., in different geographical locations), and the delivery of content to UE 701 may be coordinated via the N9 interface (e.g., as denoted in FIG. 7 by the line marked "N9" originating and terminating at UPF/PGW-U 735). Similarly, UPF/PGW-U 735 may receive traffic from UE 701 (e.g., via RAN 710, SMF/PGW-C 720, and/or one or more other devices), and may forward the traffic toward DN 750. In some embodiments, UPF/PGW-U 735 may communicate (e.g., via the N4 interface) with SMF/PGW-C 720, regarding user plane data processed by UPF/PGW-U 735.

HSS/UDM 740 and AUSF 745 may include one or more devices, systems, VNFs, etc., that manage, update, and/or store, in one or more memory devices associated with AUSF 745 and/or HSS/UDM 740, profile information associated with a subscriber. AUSF 745 and/or HSS/UDM 740 may perform authentication, authorization, and/or accounting operations associated with the subscriber and/or a communication session with UE 701.

DN 750 may include one or more wired and/or wireless networks. For example, DN 750 may include an Internet Protocol ("IP")-based PDN, a wide area network ("WAN") such as the Internet, a private enterprise network, and/or one or more other networks. UE 701 may communicate, through DN 750, with data servers, other UEs 701, and/or to other servers or applications that are coupled to DN 750. DN 750 may be connected to one or more other networks, such as a public switched telephone network ("PSTN"), a public land mobile network ("PLMN"), and/or another network. DN 750 may be connected to one or more devices, such as content providers, applications, web servers, and/or other devices, with which UE 701 may communicate.

Figure 8:
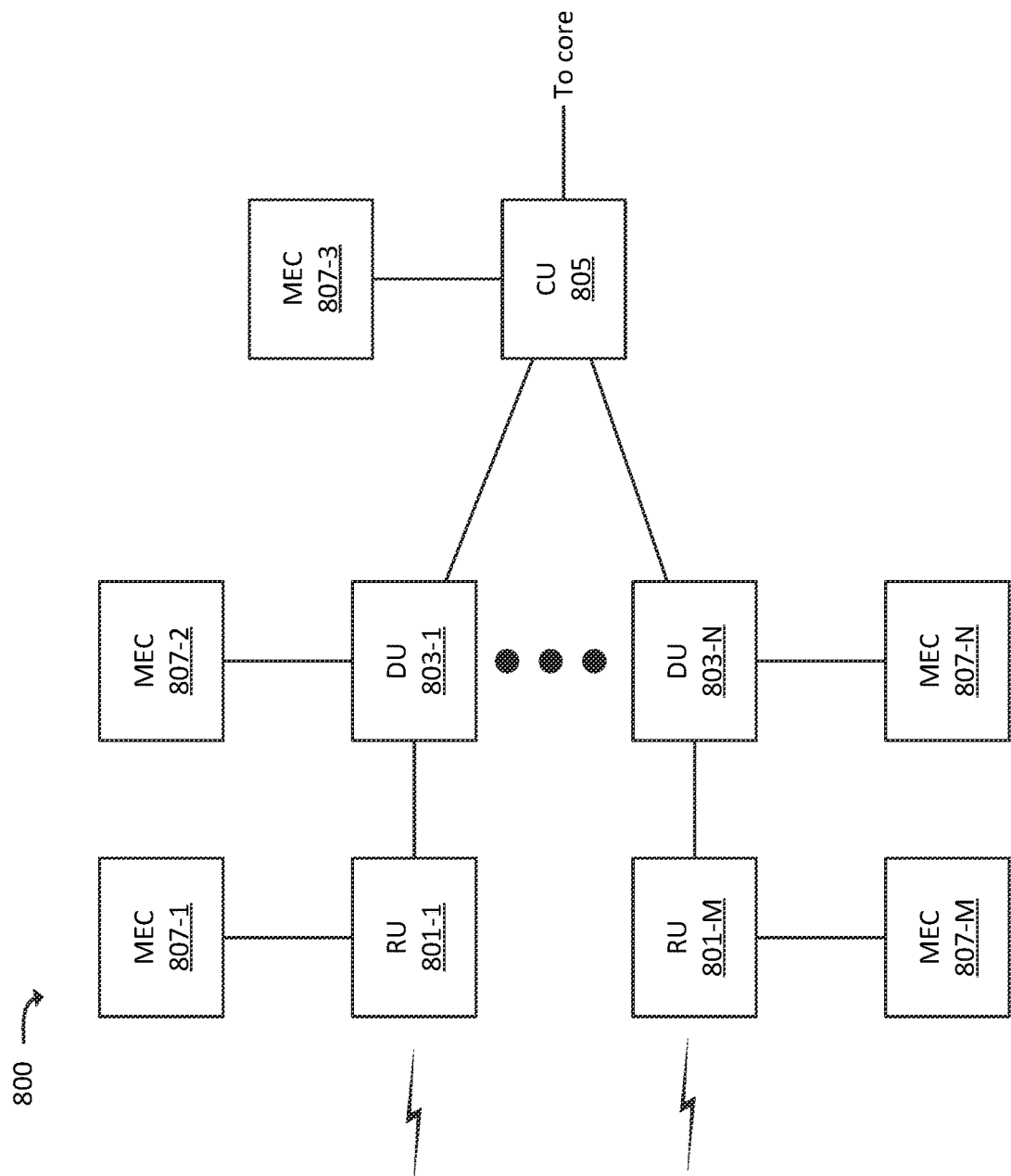
FIG. 8 illustrates an example arrangement of a radio access network ("RAN"), in accordance with some embodiments.

FIG. 8 illustrates an example Distributed Unit ("DU") network 800, which may be included in and/or implemented by one or more RANs (e.g., RAN 710, RAN 712, or some other RAN). In some embodiments, a particular RAN may include one DU network 800. In some embodiments, a particular RAN may include multiple DU networks 800. In some embodiments, DU network 800 may correspond to a particular gNB 711 of a 5G RAN (e.g., RAN 710). In some embodiments, DU network 800 may correspond to multiple gNBs 711. In some embodiments, DU network 800 may correspond to one or more other types of base stations of one or more other types of RANs. As shown, DU network 800 may include Centralized Unit ("CU") 805, one or more Distributed Units ("DUs") 803-1 through 803-N (referred to individually as "DU 803," or collectively as "DUs 803"), and one or more Radio Units ("RUs") 801-1 through 801-M (referred to individually as "RU 801," or collectively as "RUs 801").

CU 805 may communicate with a core of a wireless network (e.g., may communicate with one or more of the devices or systems described above with respect to FIG. 7, such as AMF 715 and/or UPF/PGW-U 735). In the uplink direction (e.g., for traffic from UEs 701 to a core network), CU 805 may aggregate traffic from DUs 803, and forward the aggregated traffic to the core network. In some embodiments, CU 805 may receive traffic according to a given protocol (e.g., Radio Link Control ("RLC")) from DUs 803, and may perform higher-layer processing (e.g., may aggregate/process RLC packets and generate Packet Data Convergence Protocol ("PDCP") packets based on the RLC packets) on the traffic received from DUs 803.

In accordance with some embodiments, CU 805 may receive downlink traffic (e.g., traffic from the core network) for a particular UE 701, and may determine which DU(s) 803 should receive the downlink traffic. DU 803 may include one or more devices that transmit traffic between a core network (e.g., via CU 805) and UE 701 (e.g., via a respective RU 801). DU 803 may, for example, receive traffic from RU 801 at a first layer (e.g., physical ("PHY") layer traffic, or lower PHY layer traffic), and may process/aggregate the traffic to a second layer (e.g., upper PHY and/or RLC). DU 803 may receive traffic from CU 805 at the second layer, may process the traffic to the first layer, and provide the processed traffic to a respective RU 801 for transmission to UE 701.

RU 801 may include hardware circuitry (e.g., one or more RF transceivers, antennas, radios, and/or other suitable hardware) to communicate wirelessly (e.g., via an RF interface) with one or more UEs 701, one or more other DUs 803 (e.g., via RUs 801 associated with DUs 803), and/or any other suitable type of device. In the uplink direction, RU 801 may receive traffic from UE 701 and/or another DU 803 via the RF interface and may provide the traffic to DU 803. In the downlink direction, RU 801 may receive traffic from DU 803, and may provide the traffic to UE 701 and/or another DU 803.

RUs 801 may, in some embodiments, be communicatively coupled to one or more Multi-Access/Mobile Edge Computing ("MEC") devices, referred to sometimes herein simply as "MECs" 807. For example, RU 801-1 may be communicatively coupled to MEC 807-1, RU 801-M may be communicatively coupled to MEC 807-M, DU 803-1 may be communicatively coupled to MEC 807-2, DU 803-N may be communicatively coupled to MEC 807-N, CU 805 may be communicatively coupled to MEC 807-3, and so on. MECs 807 may include hardware resources (e.g., configurable or provisionable hardware resources) that may be configured to provide services and/or otherwise process traffic to and/or from UE 701, via a respective RU 801.

For example, RU 801-1 may route some traffic, from UE 701, to MEC 807-1 instead of to a core network (e.g., via DU 803 and CU 805). MEC 807-1 may process the traffic, perform one or more computations based on the received traffic, and may provide traffic to UE 701 via RU 801-1. In this manner, ultra-low latency services may be provided to UE 701, as traffic does not need to traverse DU 803, CU 805, and an intervening backhaul network between DU network 800 and the core network. In some embodiments, MEC 807 may include, and/or may implement, some or all of the functionality described above with respect to one or more nodes 111.

Figure 9:
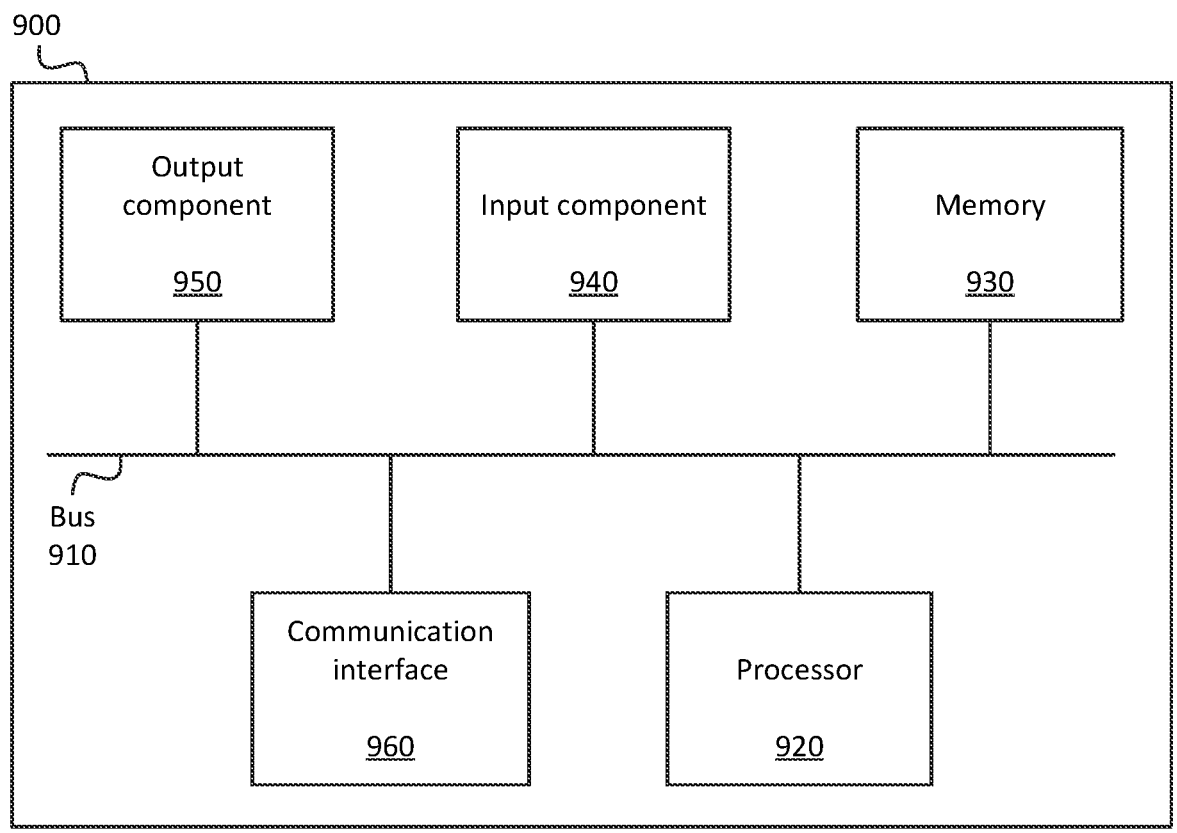
FIG. 9 illustrates example components of one or more devices, in accordance with one or more embodiments described herein.

FIG. 9 illustrates example components of device 900. One or more of the devices described above may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. In some embodiments, processor 920 may be or may include one or more hardware processors. Memory 930 may include any type of dynamic storage device that may store information and instructions for execution by processor 920, and/or any type of non-volatile storage device that may store information for use by processor 920.

Input component 940 may include a mechanism that permits an operator to input information to device 900 and/or other receives or detects input from a source external to 940, such as a touchpad, a touchscreen, a keyboard, a keypad, a button, a switch, a microphone or other audio input component, etc. In some embodiments, input component 940 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-6), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance.

Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A first device, comprising:
one or more processors and a non-transitory computer-readable medium configured to:
establish a communication session with a second device, wherein the communication session is associated with a communication session identifier;
generate a first key based on a second key and a third key;
encrypt a communication using the first key;
output the encrypted communication to the second device; and
output, to a blockchain system, the second key and an indication that the second key is associated with the communication session identifier,
wherein the second device:
obtains the second key from the blockchain system based on the indication that the second key is associated with the communication session identifier,
generates the first key based on the second key and a fourth key, and
decrypts the encrypted communication using the first key generated based on the second key and the fourth key.

2. The first device of claim 1, wherein the first key is a symmetric key.

3. The first device of claim 1, wherein the first, second, third, and fourth keys are associated with a double ratchet encryption technique.

4. The first device of claim 1, wherein the second key is a public key of an asymmetric key pair, and wherein the third key is a private key of the asymmetric key pair.

5. The first device of claim 4, wherein the asymmetric key pair is a first asymmetric key pair, and wherein the fourth key is a private key of a second asymmetric key pair.

6. The first device of claim 1, wherein the one or more processors are further configured to:
identify one or more contacts from a contact list associated with the first device; and
output, to one or more devices associated with the one or more contacts, an invitation to participate in the blockchain system as nodes of the blockchain system.

7. The device of claim 1, wherein the one or more processors are further configured to:
output the communication session identifier to the second device, or
receive the communication session identifier from the second device.

8. A system, comprising:
a blockchain system;
a first device comprising one or more processors and a non-transitory computer-readable medium configured to:
establish a communication session with a second device, wherein the communication session is associated with a communication session identifier;
generate a first key based on a second key and a third key;
encrypt a communication using the first key;
output the encrypted communication; and
output, to the blockchain system, the second key and an indication that the second key is associated with the communication session identifier; and
the second device, wherein the second device is configured to:
receive the encrypted communication;
obtain the second key from the blockchain system based on the indication that the second key is associated with the communication session identifier;
generate the first key based on the second key and a fourth key; and
decrypt the encrypted communication using the first key generated based on the second key and the fourth key.

9. The system of claim 8, wherein the first key is a symmetric key.

10. The system of claim 8, wherein the first, second, third, and fourth keys are associated with a double ratchet encryption technique.

11. The system of claim 8, wherein the second key is a public key of an asymmetric key pair, and wherein the third key is a private key of the asymmetric key pair.

12. The system of claim 11, wherein the asymmetric key pair is a first asymmetric key pair, and wherein the fourth key is a private key of a second asymmetric key pair.

13. The system of claim 8, wherein the first device is further configured to:
identify one or more contacts from a contact list associated with the first device; and
output, to one or more devices associated with the one or more contacts, an invitation to participate in the blockchain system as nodes of the blockchain system.

14. The system of claim 8,
wherein the first device is configured to output the communication session identifier to the second device, or
wherein the second device is configured to output the communication session identifier to the first device.

15. A method, comprising:
establishing, by a first device, a communication session with a second device, wherein the communication session is associated with a communication session identifier;
generating, by the first device, a first key based on a second key and a third key;
encrypting, by the first device, a communication using the first key;
outputting, by the first device and to the second device, the encrypted communication; and
outputting, by the first device and to a blockchain system, the second key and an indication that the second key is associated with the communication session identifier,
wherein the second device:
obtains the second key from the blockchain system based on the indication that the second key is associated with the communication session identifier,
generates the first key based on the second key and a fourth key, and
decrypts the encrypted communication using the first key generated based on the second key and the fourth key.

16. The method of claim 15, wherein the first key is a symmetric key.

17. The method of claim 15, wherein the first, second, third, and fourth keys are associated with a double ratchet encryption technique.

18. The method of claim 15, wherein the second key is a public key of a first asymmetric key pair, wherein the third key is a private key of the asymmetric key pair, and wherein the fourth key is a private key of a second asymmetric key pair.

19. The method of claim 15, further comprising:
   identifying one or more contacts from a contact list associated with the first device; and
   outputting, to one or more devices associated with the one or more contacts, an invitation to participate in the blockchain system as nodes of the blockchain system.

20. The method of claim 15, further comprising at least one of:
   outputting the communication session identifier to the second device, or
   receiving the communication session identifier from the second device.

* * * * *